(12) United States Patent
Addiego

(10) Patent No.: US 9,227,880 B2
(45) Date of Patent: Jan. 5, 2016

(54) HIGH POROSITY CORDIERITE HONEYCOMB ARTICLES

(71) Applicant: Corning Incorporated, Corning, NY (US)

(72) Inventor: William Peter Addiego, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/341,002

(22) Filed: Jul. 25, 2014

(65) Prior Publication Data

US 2014/0336033 A1   Nov. 13, 2014

Related U.S. Application Data

(62) Division of application No. 12/468,439, filed on May 19, 2009, now Pat. No. 8,894,917.

(60) Provisional application No. 61/130,480, filed on May 30, 2008.

(51) Int. Cl.
| | |
|---|---|
| C04B 38/06 | (2006.01) |
| C04B 38/00 | (2006.01) |
| C04B 35/195 | (2006.01) |
| C04B 111/00 | (2006.01) |

(52) U.S. Cl.
CPC ............ *C04B 38/0006* (2013.01); *C04B 35/195* (2013.01); *C04B 38/0695* (2013.01); *C04B 2111/0081* (2013.01); *C04B 2111/00793* (2013.01); *C04B 2235/3217* (2013.01); *C04B 2235/3218* (2013.01); *C04B 2235/349* (2013.01); *C04B 2235/3418* (2013.01); *C04B 2235/3445* (2013.01); *C04B 2235/52* (2013.01); *C04B 2235/5436* (2013.01); *C04B 2235/5445* (2013.01); *C04B 2235/5472* (2013.01)

(58) Field of Classification Search
CPC .. C04B 35/195; C04B 38/0006; C04B 38/06; C04B 38/0605
See application file for complete search history.

(56) References Cited

U.S. PATENT DOCUMENTS

| | | | |
|---|---|---|---|
| 5,258,150 | A | 11/1993 | Merkel et al. |
| 6,159,893 | A | 12/2000 | Kondo |
| 6,562,284 | B2 | 5/2003 | Beall et al. |
| 6,773,481 | B2 | 8/2004 | Noguchi et al. |
| 6,818,580 | B2 | 11/2004 | Kumazawa et al. |
| 6,864,198 | B2 | 3/2005 | Merkel |
| 7,141,087 | B2 | 11/2006 | Noguchi et al. |

(Continued)

FOREIGN PATENT DOCUMENTS

| | | |
|---|---|---|
| EP | 0 753 490 | 1/1997 |
| WO | 2007/061457 | 5/2007 |

*Primary Examiner* — Karl Group
(74) *Attorney, Agent, or Firm* — Charles A. Greene

(57) ABSTRACT

Methods of making a porous cordierite ceramic honeycomb article are provided. In example methods, a batch composition includes a quantity of non-crosslinked pore former provided as a superaddition of about 20% or less of a dry weight of a quantity of inorganic components. Batch compositions are also provided that include a quantity of clay and other substantially nonfibrous inorganic components sufficient to yield an article including cordierite. Example batch compositions can include clay having a median particle size of about 7 μm or less and/or provided in an amount that is 10% or less of the dry weight of the quantity of inorganic components.

8 Claims, 2 Drawing Sheets

(56) References Cited

U.S. PATENT DOCUMENTS

| | | |
|---|---|---|
| 7,179,316 B2 | 2/2007 | Merkel et al. |
| 7,744,670 B2 * | 6/2010 | Miao et al. .................. 55/523 |
| 2004/0148916 A1 | 8/2004 | Merkel et al. |
| 2004/0152593 A1 | 8/2004 | Cutler et al. |
| 2005/0069469 A1 | 3/2005 | Fu et al. |
| 2005/0120690 A1 * | 6/2005 | Noguchi et al. ............... 55/523 |
| 2006/0030475 A1 * | 2/2006 | Beall et al. .................... 501/119 |
| 2006/0193756 A1 * | 8/2006 | Suzuki et al. ................. 422/177 |
| 2007/0119134 A1 | 5/2007 | Beal et al. |
| 2007/0119135 A1 | 5/2007 | Miao et al. |
| 2007/0142208 A1 | 6/2007 | Addiego et al. |
| 2007/0261378 A1 | 11/2007 | Miao et al. |
| 2014/0357483 A1 * | 12/2014 | Holowka et al. ............. 504/100 |

* cited by examiner

HIGH POROSITY CORDIERITE HONEYCOMB ARTICLES

CROSS REFERENCE TO RELATED APPLICATIONS

This application is a divisional and claims the benefit of priority to U.S. application Ser. No. 12/468,439 filed on May 19, 2009, now U.S. Pat. No. 8,894,917, which claims the benefit of priority to U.S. Provisional Application Ser. No. 61/130,480, filed on May 30, 2008 and entitled "High Porosity Cordierite Honeycomb Articles", both of which are hereby incorporated by reference for all purposes as if fully set forth herein.

TECHNICAL FIELD

The present invention relates generally to manufacture of porous ceramic articles, and more particularly, to the manufacture of high porosity cordierite honeycomb articles.

BACKGROUND

Porous cordierite honeycomb articles are known to facilitate filtering of fluid to remove undesirable components. For example, porous cordierite honeycomb articles are known to filter exhaust gases from an engine before releasing the filtered exhaust gas to the atmosphere.

In order to manufacture cordierite having a high porosity, a batch composition is typically provided with a quantity of inorganic components and a significant superaddition of pore former. The inorganic components are typically provided of the type and respective quantity sufficient to form cordierite ($Mg_2Al_4Si_5O_{18}$) upon firing. Providing a relatively high superaddition of pore former in the batch composition is known to increase porosity of the cordierite honeycomb article upon firing. Indeed, during the firing process, the superaddition of pore former is initially burned off to leave behind pores within the body. Further firing causes the inorganic components to react and sinter to form a porous cordierite honeycomb article.

The significant superaddition of pore former is effective to increase the porosity of the cordierite honeycomb article. However, large amounts of pore former can increase costs and processing difficulties that lead to low selects. For example, large amounts of pore former results in a high level of organics that must burn out during the firing process. The burn out of the relatively high superaddition of pore former can result in increased heat and temperature differentials that may cause cracking of the article. Large amounts of pore former can also cause undesirable shrinkage during the firing process.

SUMMARY

In one aspect, a method of making a porous cordierite ceramic honeycomb article is provided. The method comprises the steps of providing a batch composition including a quantity of non-crosslinked pore former and a quantity of substantially nonfibrous inorganic components, wherein the quantity of pore former comprises a superaddition of about 20% or less of a dry weight of the quantity of inorganic components. The method further includes the step of forming the batch composition into a green body and firing the green body to produce a porous ceramic honeycomb article including cordierite ($Mg_2Al_4Si_5O_{18}$). The porous ceramic honeycomb article includes a porosity of at least 50% with pores including a median pore size of less than about 12 µm.

In a further aspect, a batch composition for manufacturing a porous cordierite ceramic article is provided. The batch composition comprises a quantity including substantially nonfibrous inorganic components sufficient to yield an article including cordierite ($Mg_2Al_4Si_5O_{18}$) upon firing. The substantially nonfibrous inorganic components include clay having a median particle size of about 7 µm or less. The batch composition further includes a quantity of non-crosslinked pore former configured to facilitate porosity development in a cordierite ceramic article. The quantity of pore former comprises a superaddition of about 20% or less of a dry weight of the quantity of inorganic components, wherein upon firing, the cordierite ceramic article includes a porosity of at least 50%.

In yet another aspect, another batch composition for manufacturing a porous cordierite ceramic article is provided. The batch composition comprises a quantity including substantially nonfibrous inorganic components sufficient to yield an article including cordierite ($Mg2Al_4Si_5O_{18}$) upon firing. The substantially nonfibrous inorganic components include clay in an amount that is 10% or less of a dry weight of the quantity of inorganic components. The batch composition further includes a quantity of non-crosslinked pore former configured to facilitate porosity development in a cordierite ceramic article. The quantity of pore former comprises a superaddition of about 20% or less of the dry weight of the quantity of inorganic components, wherein upon firing, the cordierite ceramic article includes a porosity of at least 50%.

It is to be understood that both the foregoing general description and the following detailed description present example and explanatory embodiments of the invention, and are intended to provide an overview or framework for understanding the nature and character of the invention as it is claimed.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION

Figure 1:
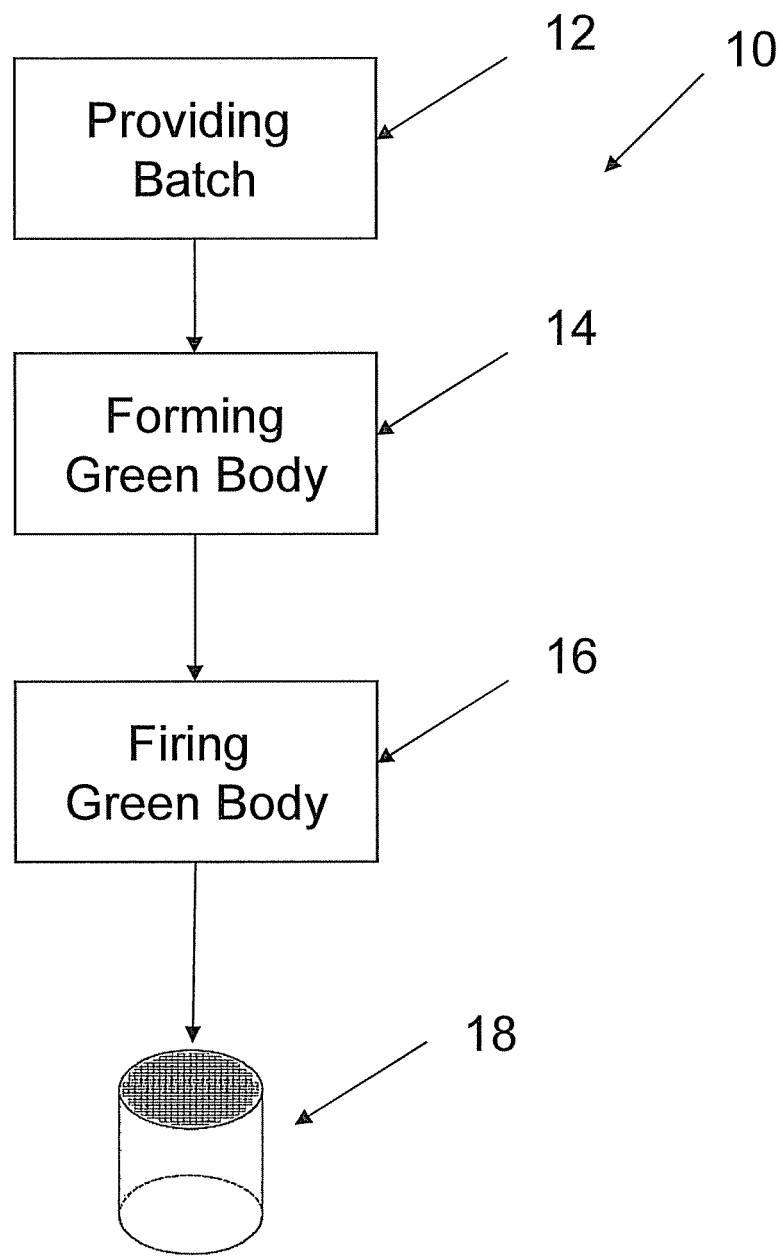
FIG. 1 depicts a method of making a porous cordierite ceramic honeycomb article in accordance with example aspects of the present invention.

Porous cordierite ceramic honeycomb articles can be formed with a wide variety of batch compositions including a quantity of substantially nonfibrous inorganic components. The quantity of inorganic components can include oxide sources of magnesia, alumina and silica in stoichiometric proportions effective to form cordierite ($Mg_2Al_4Si_5O_{18}$) upon firing. Such oxide sources can be provided, for example, by talc, alumina, aluminum hydroxides, clay, and/or silica. In one example, the porous ceramic honeycomb article can comprise about 85% to about 100% cordierite, such as about 95% to about 100% cordierite. In further examples, the porous ceramic honeycomb article can comprise 97% cordierite. Other types or compounds (e.g., mullite or spinel) might exist that make up the 3-5% of the porous ceramic honeycomb article. These other types of compounds can form due to an inexact stoichiometric mixture of inorganic components and/or inorganic components that are not dispersed sufficiently throughout the green body. These other types of compounds can actually help in achieving a porous article because of the particle size and crystal structure.

Various cordierite ceramic honeycomb articles may be produced with the concepts of the present invention. For example, honeycomb articles can be formed with a honeycomb structure disclosed in U.S. Pat. No. 6,562,284 to Beall et al. that is herein incorporated by reference in its entirety. In one example, the honeycomb articles of the present invention can include cell geometries with a cell density of greater than 200 cells/in$^2$ (cpsi). In further examples, honeycomb articles of the present invention can include cell geometries with a cell density of greater than about 300 cpsi, such as greater than about 400 cpsi, 500 cpsi, 600 cpsi, 700 cpsi, 800 cpsi, or 900 cpsi. Furthermore, the walls forming the cells are porous and can have a wall thickness of less than 12 mil (305 μm). Providing honeycomb articles with a cell density of greater than 200 cpsi and a wall thickness of less than 12 mil can be desirable for automobile exhaust filtering applications.

The quantity of inorganic components can each be provided with various median particle sizes having a large or small statistical range of particle sizes. In one example, the quantity of inorganic components includes clay [$Al_2Si_2O_5(OH)_4$] that may be provided with one or more particle sizes. For instance, clay, if provided, can be included with 95% of the particles having sizes of less than about 25 μm such as less than about 15 μm or less than about 10 μm. In further examples, clay can have a median particle size of about 7 μm or less, such as about 3 μm or less. In one example, clay can have a median particle size of about 7 μm with 95% of the particles having a size of less than about 25 μm. In another example, clay can have a median particle size of about 3 μm with 95% of the particles having a size of less than about 10 μm.

Clay can also be added in a wide variety of percentages of the overall dry weight of the quantity of inorganic components forming the batch composition. For example, clay can be provided as 20% or less, 13% or less, or 10% or less, of the dry weight of the quantity of inorganic components. In another example, clay can be provided as about 5% to about 15%, such as about 8% to about 10% of the dry weight of the quantity of inorganic components.

In another example, the quantity of inorganic components includes alumina ($Al_2O_3$) that may be provided with one or more particle sizes. Alumina, if provided, can be included with 95% of the particles having sizes of less than about 30 μm with a median particle size of about 10 μm or less, such as about 7 μm or less. In further examples, Alumina can be included with 95% of the particles having sizes of less than about 6 μm with a median particle size of about 2 μm or less such as about 1 μm or less. In further examples, Alumina can be included with 95% of the particles having sizes of less than 6 μm with a median particle size of about 0.5 μm.

In addition to alternative particle sizes, alumina, if provided, can be added in a wide variety of percentages of the overall dry weight of the quantity of inorganic components forming the batch composition. For example, alumina can be provided as about 10% to about 75%, such as about 20% to about 40% or about 25% to about 35% of the dry weight of the quantity of inorganic components. In further examples, alumina can be provided as about 27% to about 29% of the dry weight of the quantity of inorganic components.

In another example, the quantity of inorganic components includes aluminum hydroxide, such as aluminum oxide hydroxide [AlO(OH)] that may be provided with one or more particle sizes. Aluminum oxide hydroxide disperses in water and the particle size is very dependent on the pH of the water. Aluminum oxide hydroxide can be provided in some examples. In further examples, the quantity of inorganic components may be provided without any dispersable alumina in the batch. Aluminum oxide hydroxide, if provided, can be added with a median particle size having a large or small range of particles sizes. In one example, aluminum oxide hydroxide can be provided with a median particle size of about 15 μm or less in a dispersion of water. In further examples, the aluminum oxide hydroxide can be provided with 95% of the particles having a size of 60 μm or less, such as 40 μm or less, or 20 μm or less.

In addition to alternative particle sizes, aluminum oxide hydroxide, if provided, can be added in a wide variety of percentages of the overall dry weight of the quantity of inorganic components forming the batch composition. For example, aluminum oxide hydroxide can be provided as 15% or less of the dry weight of the quantity of inorganic components. In another example, aluminum oxide hydroxide can be provided as less than 5%, such as about 2% of the dry weight of the quantity of inorganic components.

In another example, the quantity of inorganic components includes silica ($SiO_2$) that may be provided with one or more particle sizes. In one example, relatively coarse silica can be used. For example, relatively coarse silica can be included with 95% of the particles having sizes less than about 75 μm with a median particle size of about 35 μm or less, such as about 25 μm or less. In further examples, relatively fine silica can be used. For example, relatively fine silica can be included with 95% of the particles having sizes less than about 40 μm with a median particle size of about 15 μm or less, such as about 10 μm or less, such as about 4 μm or 5 μm or less.

In addition to alternative particle sizes, silica, if provided, can be added in a wide variety of percentages of the overall dry weight of the quantity of inorganic components forming the batch composition. For example, silica can be provided as 50% or less, such as 30% or less, of the dry weight of the quantity of inorganic components. In further examples, silica can be provided as about 5% to about 25%, such as about 10% to about 20% of the dry weight of the quantity of inorganic components. In further examples, silica can be provided as 17% or more of the dry weight of the quantity of inorganic components. For example, silica can be provided as about 17% to about 50%, about 17% to about 30%, about 17% to about 25% or about 17% to about 20% of the dry weight of the quantity of inorganic components. In yet another example, coarse and fine silica can be provided together in the same quantity of inorganic components.

In one example, the quantity of inorganic components includes talc [$Mg_3Si_4O_{10}(OH)_2$] that may be provided with one or more particle sizes. Talc, if provided, can be included with 95% of the particles having a size of less than 20 μm, such as less than about 15 μm or less than about 10 μm. In further examples, talc can have a median particle size of 6 μm or less, such as about 5 μm.

In addition to alternative particle sizes, talc, if provided, can be added in a wide variety of percentages of the overall dry weight of the quantity of inorganic components forming the batch composition. For example, talc can be provided as about 45% or less, such as about 42.2% of the dry weight of the quantity of inorganic components. Without other sources of magnesium present, the amount of talc in the inorganic batch can be relatively fixed to create stoichiometric cordierite. In further examples, no talc or a smaller amount of talc can be provided when other magnesium bearing compounds are present. Such magnesium bearing compounds (e.g., magnesium hydroxide, magnesium carbonate, magnesium acetate, or the like) would not change the amounts of clay, alumina, aluminum oxide hydroxide and silica necessary to create stoichiometric cordierite.

The batch composition can further include a quantity of non-crosslinked pore former that can include but are not limited to: starch and starch-based materials (e.g., potato starch, rice starch), cellulose-based compounds (e.g., flour), carbon (e.g., graphite, activated carbon, or coke), polymers of various species and molecular weights (e.g., synthetic or naturally occurring polymers), and foaming agents.

The quantity of non-crosslinked pore formers can include various particle sizes. For example, graphite can be provided with 95% of the particles having a size of about 80 μm or less, wherein the median particle size is 15 μm or less, such as about 8 pm. In another example, rice starch can be provided with 95% of the particles having a size of less than about 50 μm, wherein the median particle size of the rice starch is from about 0.5 μm to about 15 μm, such from about 4 μm to about 7 μm. In one example, the median particle size of the rice starch is about 6 μm.

In one example, the quantity of pore former can be provided as a superaddition of the quantity of inorganic components. For example, the quantity of pore former can be added as a superaddition such that the weight percent of the superaddition of pore former is computed as 100(mass of pore former)/(dry mass of the quantity of inorganic components). The quantity of pore former can be provided as less than 30%, such as less than about 20% of the dry weight of the quantity of inorganic components. For example, a quantity of rice starch may be provided as a superaddition of about 20% or less with no other substantial portions of pore former. In another example, a quantity of graphite can be provided as a superaddition of about 20% or less of the dry weight of the quantity of inorganic components with no other substantial portions of pore former. In still further examples, various types of pore formers may be blended together to provide a desirable pore distribution. Of instance, in one example, a quantity of rice starch may be provided as a superaddition of about 5%, about 10% or about 15% of the dry weight of the quantity of inorganic components while a quantity of graphite is provided as a superaddition, respectively, of about 15%, about 10% or about 5% of the dry weight of the quantity of inorganic components.

The batch composition can further include various organic additives used to modify the rheology of the batch such as lubricants, dispersants, surfactants and plasticizers. For instance, various additives may be provided to add plasticity and cohesiveness to the batch. For instance, cellulose ethers, such as METHOCEL™ cellulose ethers, can be provided to add plasticity and cohesiveness to the batch. If provided, cellulose ethers can be added in various amounts. For example, cellulose ethers can be added as a superaddition such that the weight percent of the superaddition of cellulose ethers is computed as 100(mass of cellulose ethers)/(dry mass of the quantity of inorganic components). For example, METHOCEL™ cellulose ethers can comprise a superaddition of about 2% to about 20%, such as about 6%, of the dry weight of the quantity of inorganic components.

Further additives may be used such as lubricants, dispersants. One example might comprise an emulsion of triethanol amine and oleic acid in water. This emulsion helps the batch extrude through the die into the green body. In another example, water and palm oil can be added to provide a desirable lubricant for extrusion while oleic acid provides a desirable dispersant for the batch. Such lubricant and dispersion aids can be provided in various quantities to the batch components. The lubricant and dispersion aids can be added as a superaddition such that the weight percent of the superaddition of the extrusion aid is computed as 100(mass of extrusion aid)/(dry mass of the quantity of inorganic components). For example, the lubricant and dispersion aids can be provided as a superaddition of about 25% or less, such as about 15% or less or 10% or less, of the dry weight of the quantity of inorganic components.

Once the batch composition is prepared, the plasticized batch can be extruded through a honeycomb die to obtain a green body. Various types of extruders may be used with aspects of the present invention. For example, a ram extruder, a single screw extruder, twin screw extruder, or other extruder configurations may be used with aspects of the present invention. The ram extruder is known to enhance the levels of porosity since there is less agitation of the batch as it is being extruded. The single screw extruder typically results in less porosity than the ram extruder since the batch composition is agitated as the batch composition is being extruded into the green body. Still further, the twin screw extruder typically results in less porosity than the single screw extruder since the parallel twin augers agitate and blend the batch material prior to being extruded through the die.

Regardless of which extruder is used, however, a porous cordierite ceramic article can be provided with significant porosity. For example, porous cordierite ceramic articles of the present invention can have a porosity of about 50% or more, about 55% or more, about 60% or more, or about 65% or more. The pores forming the cordierite ceramic articles can have various sizes. In one example, the median pore size can be less than about 12 μm, such as about 7 μm to about 11 μm, although other pore sizes may be used in further examples.

A significant percentage of the pore structure is formed by skeletal structure of inorganic components, thereby saving space for additional pore former. Accordingly, by selecting batch components of the right species, particle size and particle size distribution, the present invention can maintain a desirable level of porosity with relatively less amounts of pore former. Maintaining the desirable level of porosity increases the effectiveness of the filtering capabilities of the porous ceramic cordierite article.

Reducing the amounts of pore former also provides various benefits. For example, less pore former is burned out during the process of firing the green body. Reducing the burn out of the pore former correspondingly reduces temperature differentials during firing of the green body. Moreover, the skeletal structure of the inorganic components can further increase the strength of the article. Thus, the skeletal structure of the inorganic components and reduced temperature differentials can reduce incidents of article cracking. Furthermore, providing relatively less amounts of pore former can make it easier and less costly to process the batch composition.

Moreover, by selecting the right particle size and distribution of the individual inorganic components, it is possible to reduce shrinkage during firing of the green body into the porous ceramic honeycomb article. For example, after the green body has been extruded and dried, the green body undergoes a firing process. Low temperature shrinkage occurs between about 400° C. and about 600° C. During low temperature shrinkage, the article begins to shrink as the organic materials and residual water are driven off. Moreover, due to the nature of materials, increasing the temperature of the particles promotes shrinkage as the particles move toward one another.

As the temperature is increased, the solid state reaction begins to take place with the inorganic components and the particles begin to be sintered together. During the solid state reaction, the final pores begin to form and the density of the article increases. However, by choosing the correct particle size and distribution, the porosity is increased since the inorganics are not packed in an efficient manner. Thus, during sintering, a skeleton is formed to increase porosity with reduced pore former. Moreover, the skeleton increases the strength of the cordierite article, thereby helping the article resist shrinkage during the sintering process. The increased strength provided by the skeleton and reduced pore former can reduce volumetric shrinkage during firing of less than about 18%, such as about 7% or less during firing.

Several samples (e.g., Samples 1-3 described below) were found to provide desirable poor particle packing with the proper use of coarse, fine, and very fine particle sizes of the correct constituents that react to form cordierite. Due to the poor particle packing, the amount of shrinkage and sintering is less than conventional cordierite compositions. Moreover, due to the poor particle packing, relatively less pore former was needed to achieve desirable article porosity. The components in the examples are representative but do not include all of the potential combinations of compounds and particle size distributions that are possible.

Properties of Samples 1-3 are set forth in Tables 1-4 set forth below. Table 1 sets forth the batch material components, species and median particle sizes. The sizes of the particles found in Table 1 were measured by a MICROTRAC particle size distribution measurement instrument. The particles were measured in a slurry of methanol. Prior to measurement, the particles were sonicated in order to break up the loose aggregates to obtain a better particle size distribution. Table 2 sets forth the inorganic batch components as a percent weight of the inorganic batch. Table 3 sets forth superadditions as a percent of the dry weight of the quantity of inorganic components. Table 4 sets forth the cordierite article porosity characteristics.

TABLE 1

Batch Materials

| Component | Species | Median Particle size (µm) |
|---|---|---|
| Clay | $Al_2Si_2O_5(OH)_4$ | 3 |
| Alumina I | $Al_2O_3$ | 7 |
| Alumina II | $Al_2O_3$ | 0.5 |
| Aluminum oxide hydroxide | AlO(OH) | 15 |
| Silica I | $SiO_2$ | 25 |
| Silica II | $SiO_2$ | 4 |
| Talc | $Mg_3Si_4O_{10}(OH)_2$ | 5 |
| Starch | Rice starch | 6 |
| Graphite | — | 8 |

TABLE 2

Inorganic Batch Components (% Weight of the Inorganic Batch)

| Sample | Clay | Alumina I | Alumina II | Aluminum oxide hydroxide | Silica I | Silica II | Talc |
|---|---|---|---|---|---|---|---|
| Sample 1 | 8.3 | 28.19 | 0 | 2 | 11.3 | 8 | 42.2 |
| Sample 2 | 10 | 22.49 | 4.84 | 2 | 0 | 18.48 | 42.2 |
| Sample 3 | 8 | 28.32 | 0 | 2 | 0 | 19.45 | 42.2 |

TABLE 3

Additional Batch Components (% Weight Superadditions)

| Sample | Starch | Graphite | Cellulose Ether (METHOCEL ™) | Emulsion of oleic acid with triethanol amine |
|---|---|---|---|---|
| Comparison 1 | 0 | 0 | — | — |
| Comparison 2 | 20 | 20 | — | — |
| Sample 1 | 10 | 10 | 6 | 15 |
| Sample 2 | 20 | 0 | 6 | 15 |
| Sample 3 | 5 | 15 | 6 | 15 |

TABLE 4

Cordierite Article Porosity Characteristics

| Sample | Porosity (%) | Median Pore Size (µm) |
|---|---|---|
| Comparison 1 | 35 | 2.3 |
| Comparison 2 | 56 | 4.3 |
| Sample 1 | 59 | 10.6 |
| Sample 2 | 57 | 7.9 |
| Sample 3 | 59 | 9.5 |

Figure 1A:
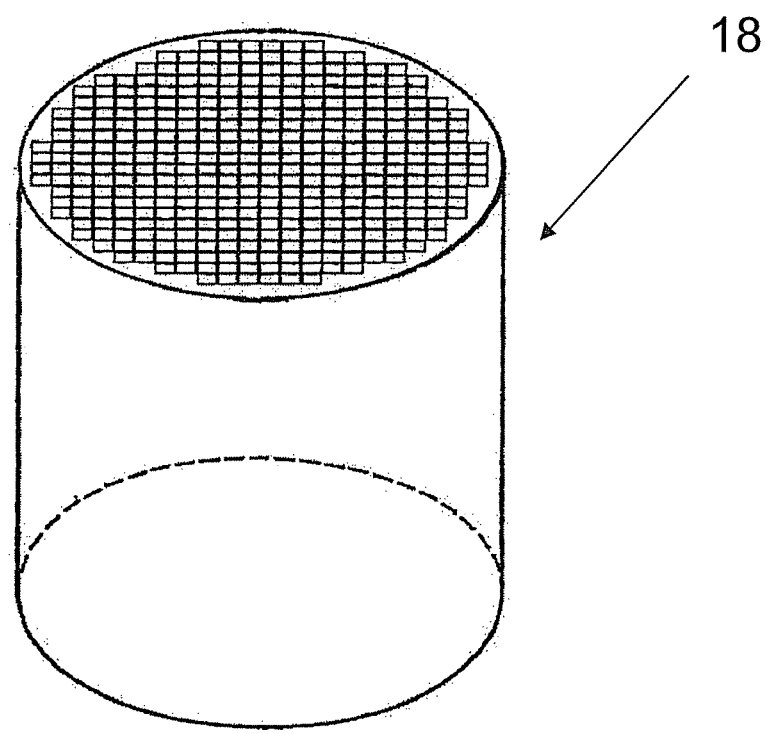
FIG. 1A depicts an enlarged schematic view of the porous cordierite ceramic honeycomb article of FIG. 1.

With reference to FIG. 1 each of Samples 1-3 can be carried out by a method 10 comprising at least the steps of providing a batch 12, forming a green body 14, and firing the green body 16 into the porous cordierite ceramic honeycomb article 18. FIG. 1A depicts an enlarged schematic view of the porous ceramic honeycomb article 18 illustrated in FIG. 1. The ceramic honeycomb article 18 is not drawn to scale and just illustrates one example schematic representation of articles that can be produced with aspects of the present invention. As schematically shown in FIG. 1A, the porous cordierite ceramic honeycomb article 18 can include cell geometries with a cell density of greater than 200 cpsi. As further schematically shown in FIG. 1A, the walls forming the cells are porous and can have a wall thickness of less than 305 µm.

Sample 1: As set forth in Tables 1 and 2 above, the inorganic components of Sample 1 comprise: 8.3% Clay; 28.19% Alumina I; 0% Alumina II; 2% Aluminum Oxide Hydroxide; 11.3% Silica I; 8% Silica II; and 42.2% Talc. As set forth in Table 3 above, the batch composition of Sample 1 includes a superaddition of 10% rice starch, 10% graphite, and 6% METHOCEL™ of the dry weight of the quantity of inorganic components. The powders were then dry-blended and then mulled with water and a superaddition of 15% emulsion of oleic acid with triethanol amine. After mulling, the plasticized Sample 1 batch composition was fed into a twin-screw extruder equipped with a honeycomb die. The plasticized material was then extruded, microwave dried into a green body, and then fired at temperatures greater than 1400° C.

Firing the Sample 1 green body resulted in a porous cordierite ceramic honeycomb article with greater than 95% cordierite, as determined by X-ray diffraction. As set forth in Table 4 above, firing the Sample 1 green body resulted in a porous cordierite ceramic honeycomb article having a porosity of 59% and a median pore size of 10.6 µm.

Sample 2: As set forth in Tables 1 and 2 above, the inorganic components of Sample 2 comprise: 10% Clay; 22.49% Alumina I; 4.84% Alumina II; 2% Aluminum Oxide Hydroxide; 0% Silica I; 18.48% Silica II; and 42.2% Talc. As set forth in Table 3 above, the batch composition of Sample 2 includes a superaddition of 20% rice starch, 0% graphite, and 6%

METHOCEL™ of the dry weight of the quantity of inorganic components. The powders were then dry-blended and then mulled with water and a superaddition of 15% emulsion of oleic acid with triethanol amine. After mulling, the plasticized Sample 2 batch composition was fed into a twin-screw extruder equipped with a honeycomb die. The plasticized material was then extruded, microwave dried into a green body, and then fired at temperatures greater than 1400° C.

Firing the Sample 2 green body resulted in a porous cordierite ceramic honeycomb article with greater than 95% cordierite, as determined by X-ray diffraction. As set forth in Table 4 above, firing the Sample 2 green body resulted in a porous cordierite ceramic honeycomb article having a porosity of 57% and a median pore size of 7.9 µm.

Sample 3: As set forth in Tables 1 and 2 above, the inorganic components of Sample 3 comprise: 8% Clay; 28.32% Alumina I; 0% Alumina II; 2% Aluminum Oxide Hydroxide; 0% Silica I; 19.45% Silica II; and 42.2% Talc. As set forth in Table 3 above, the batch composition of Sample 3 includes a superaddition of 5% rice starch, 15% graphite, and 6% METHOCEL™ of the dry weight of the quantity of inorganic components. The powders were then dry-blended and then mulled with water and a superaddition of 15% emulsion of oleic acid with triethanol amine. After mulling, the plasticized Sample 3 batch composition was fed into a twin-screw extruder equipped with a honeycomb die. The plasticized material was then extruded, microwave dried into a green body, and then fired at temperatures greater than 1400° C.

Firing the Sample 3 green body resulted in a porous cordierite ceramic honeycomb article with greater than 95% cordierite, as determined by X-ray diffraction. As set forth in Table 4 above, firing the Sample 3 green body resulted in a porous cordierite ceramic honeycomb article having a porosity of 59% and a median pore size of 9.5 µm.

Analysis:

Two-inch diameter cellular monoliths with cell densities of 400 and 600 cells/inch$^2$ compositions were made with a twin-screw extruder for each of the samples listed above. For comparison, a conventional Comparison 1 sample without pore former has a porosity of 35% and a median pore size of 2.3 µm. As shown in the Comparison 2 sample, a superaddition of 20% rice starch pore former and a superaddition of 20% graphite pore former (i.e., a total superaddition of 40% pore former) were found to increase the porosity level to 56% porosity with a median pore size of 4.3 µm.

In contrast, as demonstrated by Samples 1-3, aspects of the invention yields higher porosity with only half the amount of pore former as the Comparison 2 sample. Indeed, the total pore former used in each of Samples 1-3 comprised a superaddition of pore former in the amount of 20% of a dry weight of the quantity of inorganic components. On the other hand, the Comparison 2 sample required a superaddition of pore former in the amount of 40% of a dry weight of the quantity of inorganic components.

Processing a green body with relatively high amounts of pore former typically requires controlled firing atmospheres and/or extended firing cycles during the burnout stage. These processing requirements can be reduced by aspects of the present invention wherein the green body is processed with a relatively low amount of pore former and proper selection of particle size and distribution of the individual inorganic components. Providing a batch composition with a reduced superaddition of pore former can also lower the cost of manufacturing the porous cordierite ceramic honeycomb articles, reduced cracking during firing, and reduce shrinkage of the green body.

It will be apparent to those skilled in the art that various modifications and variations can be made in the present invention without departing from the spirit or scope of the invention. Thus, it is intended that the present invention cover the modifications and variations of this invention provided they come within the scope of the appended claims.

What is claimed is:

1. A batch composition for manufacturing a porous cordierite ceramic article comprising:
    a quantity including substantially nonfibrous inorganic components sufficient to yield an article including cordierite ($Mg_2Al_4Si_5O_{18}$) upon firing, the quantity of components including clay having a median particle size of about 7 µm or less; and
    a quantity of non-crosslinked pore former configured to facilitate porosity development in a cordierite ceramic article, the quantity of pore former comprising a superaddition of about 20% or less of a dry weight of the quantity of inorganic components, wherein upon firing, the cordierite ceramic article includes a porosity of at least 50%,
    wherein the quantity of substantially nonfibrous inorganic components comprises relatively coarse silica and relatively fine silica;
    wherein the relatively coarse silica comprises silica having 95% of particles with sizes less than about 75 µm and with a median particle size of about 35 µm or less; and
    wherein the relatively fine silica comprises silica having 95% of particles with sizes less than about 40 µm and with a median particle size of about 15 µm or less.

2. The batch composition of claim 1, wherein the clay is present in an amount of about 20% or less of the dry weight of the quantity of inorganic components.

3. The batch composition of claim 2, wherein the amount of clay is 10% or less of the dry weight of the quantity of inorganic components.

4. The batch composition of claim 1, wherein the median particle size of the clay is about 3 µm or less.

5. The batch composition of claim 1, wherein the silica is present in an amount of about 17% or more of the dry weight of the quantity of inorganic components.

6. A batch composition for manufacturing a porous cordierite ceramic article comprising:
    a quantity including substantially nonfibrous inorganic components sufficient to yield an article including cordierite ($Mg_2Al_4Si_5O_{18}$) upon firing, the quantity of components including clay in an amount that is 10% or less of a dry weight of the quantity of inorganic components; and
    a quantity of non-crosslinked pore former configured to facilitate porosity development in a cordierite ceramic article, the quantity of pore former comprising a superaddition of about 20% or less of the dry weight of the quantity of inorganic components, wherein upon firing, the cordierite ceramic article includes a porosity of at least 50%,
    wherein the quantity of substantially nonfibrous inorganic components comprises relatively coarse silica and relatively fine silica;
    wherein the relatively coarse silica comprises silica having 95% of particles with sizes less than about 75 µm and with a median particle size of about 35 µm or less; and
    wherein the relatively fine silica comprises silica having 95% of particles with sizes less than about 40 µm and with a median particle size of about 15 µm or less.

7. The batch composition of claim 6, wherein the median particle size of the clay is about 3 µm or less.

8. The batch composition of claim 6, wherein the silica is present in an amount of about 17% or more of the dry weight of the quantity of inorganic components.

* * * * *